No. 799,200. PATENTED SEPT. 12, 1905.
H. L. SLAGER.
ABRASIVE COMPOUND.
APPLICATION FILED NOV. 16, 1904.
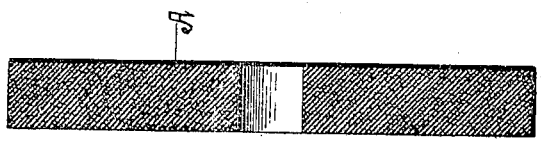
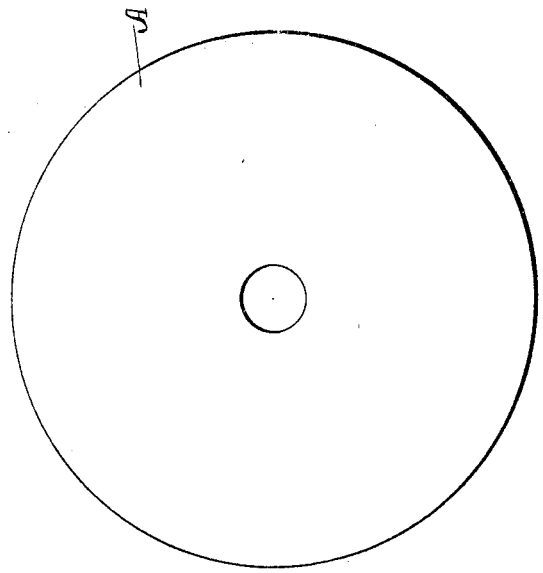
Witnesses
G. Howard Walmsley.
Irene Miller.
Inventor
Henry L. Slager,
By
Attorney

UNITED STATES PATENT OFFICE.

HENRY L. SLAGER, OF SPRINGFIELD, OHIO, ASSIGNOR TO THE SPRINGFIELD TIRE & RUBBER COMPANY, OF SPRINGFIELD, OHIO, A CORPORATION OF OHIO.

ABRASIVE COMPOUND.

No. 799,200.          Specification of Letters Patent.          Patented Sept. 12, 1905.

Application filed November 16, 1904. Serial No. 232,937.

*To all whom it may concern:*

Be it known that I, HENRY L. SLAGER, a citizen of the United States, residing at Springfield, in the county of Clark and State of Ohio, have invented certain new and useful Improvements in Abrasive Compounds, of which the following is a specification, reference being had therein to the accompanying drawings.

This invention relates to abrasive compounds, and has for its object to provide a compound or composition of matter adapted for use in polishing tools—such as polishing wheels, blocks, or sticks and other forms in which abrasive material is employed—which shall be efficient in operation, produce a polishing-wheel sufficiently strong to be capable of use at high speed and having a smooth and efficient polishing-surface, besides possessing other advantages hereinafter pointed out.

To these ends my invention consists in the matter hereinafter described and then specifically pointed out in the claims.

In the accompanying drawings, Figure 1 is a side elevation of an abrasive wheel embodying my invention, and Fig. 2 a sectional view of the same.

In carrying out my invention I construct my improved abrasive compound of rubber or rubber compound, a fibrous material, preferably wool fiber in the form of comminuted felt or wool flock, and a suitable abrasive, such as emery, corundum, or the like. By rubber or rubber compound I include any of the known mixtures of rubber or rubber and other ingredients with sulfur for vulcanizing purposes, many of these compounds being known to those skilled in the art and being generally referred to under the generic name of "rubber," although composed only in part of pure rubber, and I employ a sufficient proportion of sulfur to give the desired hardness to the compound in connection with the heat and pressure employed. As an abrasive I prefer emery, although other known equivalents—such as corundum, carborundum, or the like—may be employed or a mixture thereof, as may be deemed desirable. The fibrous material is preferably in the form of wool-flock, although other similar fibers may be employed. These several ingredients may be mixed in various proportions, those which I prefer being, by weight, one part of the rubber compound, including the sulfur, two and one-half parts, by weight, of the emery or other abrasive, and one-half part, by weight, of the felt fiber or wool-flock. These ingredients are thoroughly mixed while heated and are then molded into any desired shape under steam-pressure, so as to vulcanize the compound and give it the desired hardness. The rubber or rubber compound acts as a cement or medium to receive and hold the abrasive material, while the fiber acts as a binder to increase the tenacity of the rubber and at the same time render it less liable to heat. By reason of its presence the compound may be made sufficiently soft, if desired, to prevent the abrasive particles from scratching under undue pressure by permitting the supporting material to yield, while at the same time the compound will have sufficient strength and tenacity to give it a wide range of use under varying conditions. The fiber, moreover, causes the compound to present a smooth working surface which holds and retains the small abrasive particles as well as the metallic dust caused by the abrasive action of the tool, thus rendering it highly efficient as a polishing device, to which it is more particularly adapted, particularly in view of the non-scratching feature above referred to.

In the drawings I have shown the compound as molded into the form of an abrasive wheel A of the usual form; but it may be molded into any desired shape—such as blocks, sticks, or bars—as is usual with such compounds.

I do not wish to be understood as limiting myself to the precise proportion of parts above indicated as preferred, since these proportions may be varied without departing from the principle of my invention.

Having thus fully described my invention, what I claim as new, and desire to secure by Letters Patent, is—

1. An abrasive compound comprising rubber, an abrasive material, and a binder of fibrous material, mixed and vulcanized, substantially as described.

2. An abrasive compound comprising rubber, an abrasive material, and a binder of comminuted felt or wool flock, mixed and vulcanized, substantially as described.

3. An abrasive compound comprising rubber, an abrasive material, and a binder of fiber, in substantially the proportions by weight of one part, two and one-half parts, and one-half part, respectively, mixed and vulcanized, substantially as described.

4. The hereinbefore-described composition of matter for polishing wheels and the like, comprising rubber, an abrasive material, and a fibrous material, the same being woolen fibers in a finely comminuted or flocculent condition, thoroughly intermixed, molded and vulcanized under heat and pressure, substantially as described.

In testimony whereof I affix my signature in presence of two witnesses.

HENRY L. SLAGER.

Witnesses:
 AL H. KUNKLE,
 IRVINE MILLER.